Sept. 11, 1962 H. D. MAGUIRE 3,053,033
MOWER ATTACHMENT FOR TRACTORS
Filed Feb. 25, 1960 6 Sheets-Sheet 1
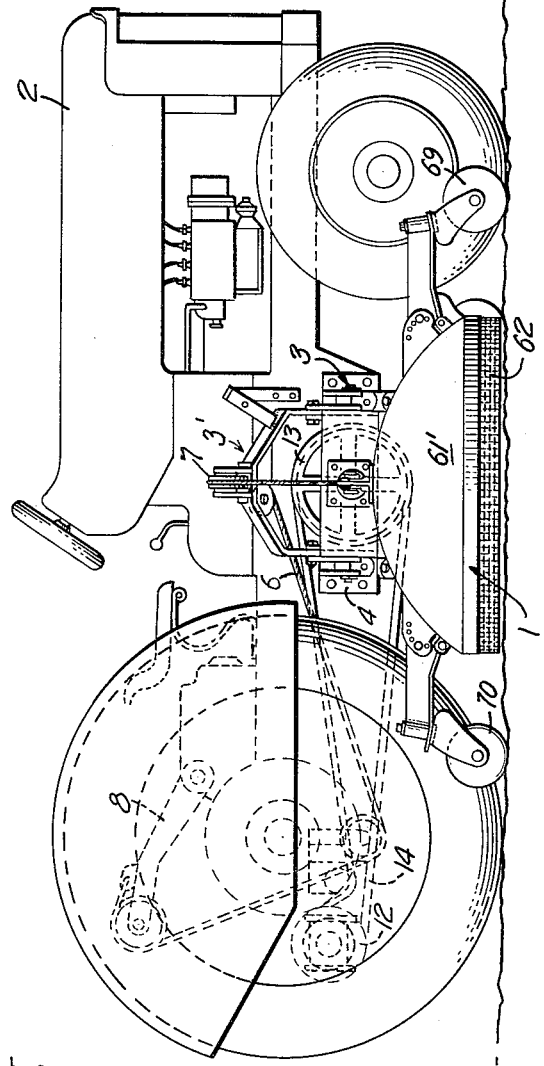
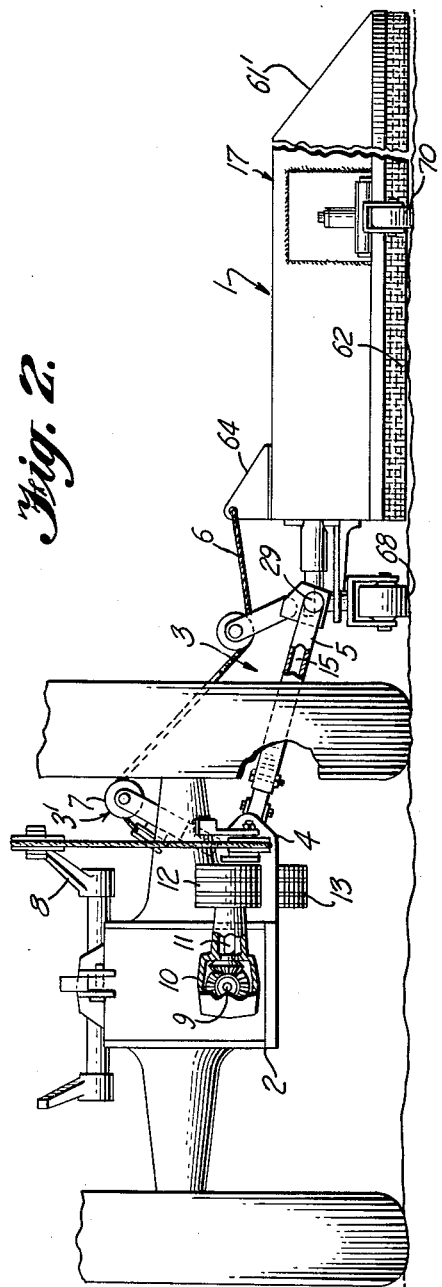
INVENTOR
*Harold D. Maguire*
BY
*Mason, Fenwick & Lawrence*
ATTORNEYS

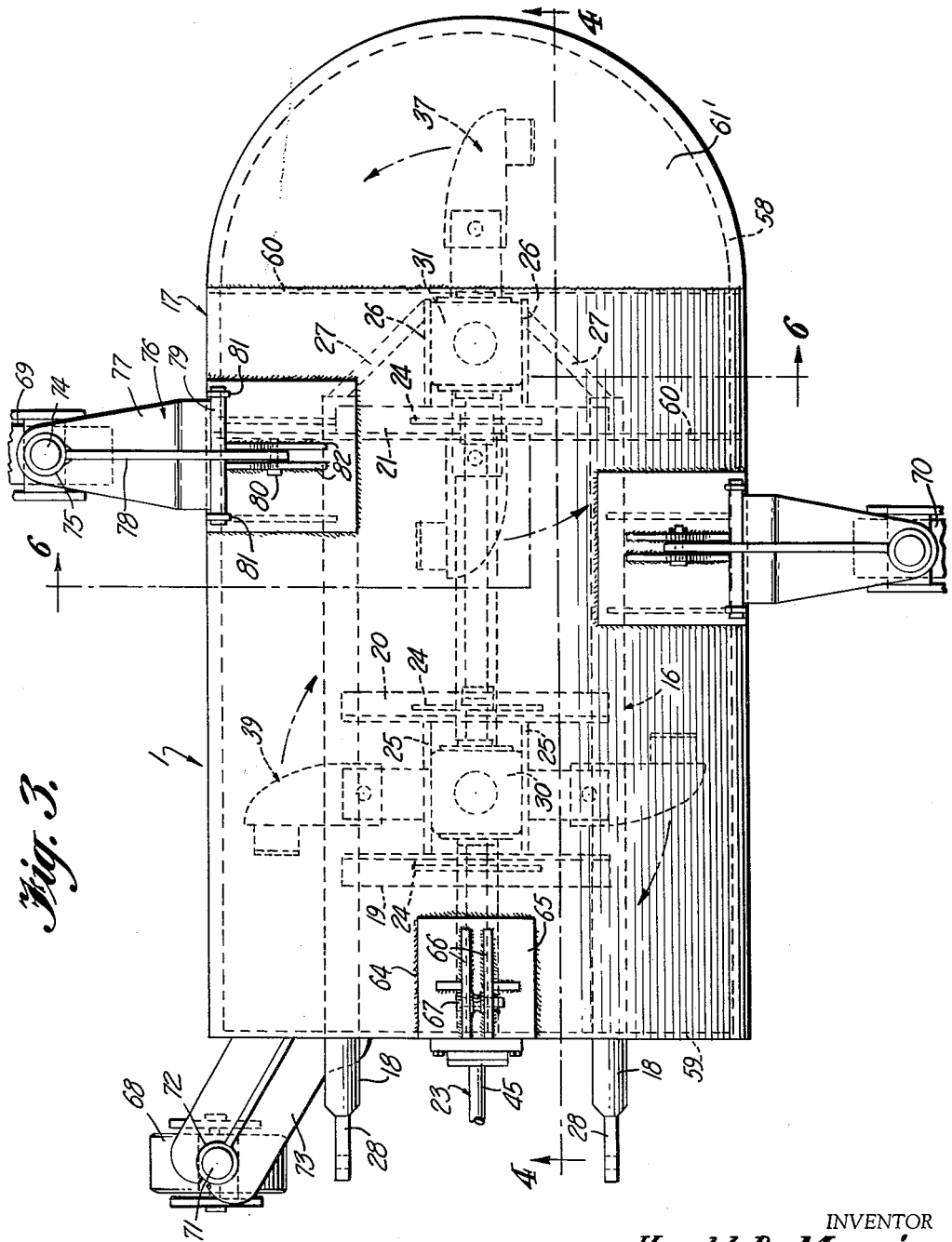

Sept. 11, 1962 H. D. MAGUIRE 3,053,033
MOWER ATTACHMENT FOR TRACTORS
Filed Feb. 25, 1960 6 Sheets-Sheet 3
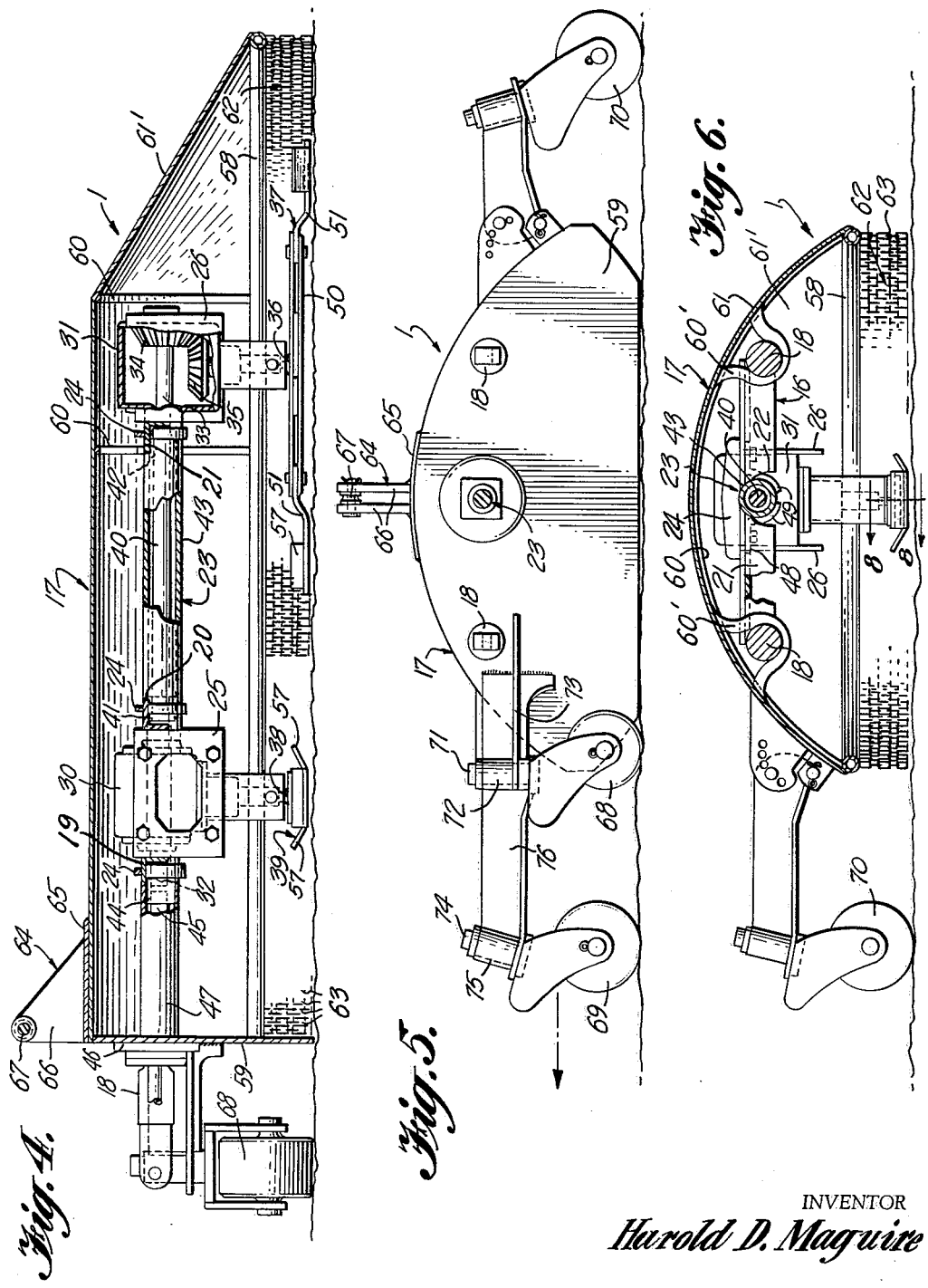
INVENTOR
Harold D. Maguire
BY
Mason, Fenwick & Lawrence
ATTORNEYS

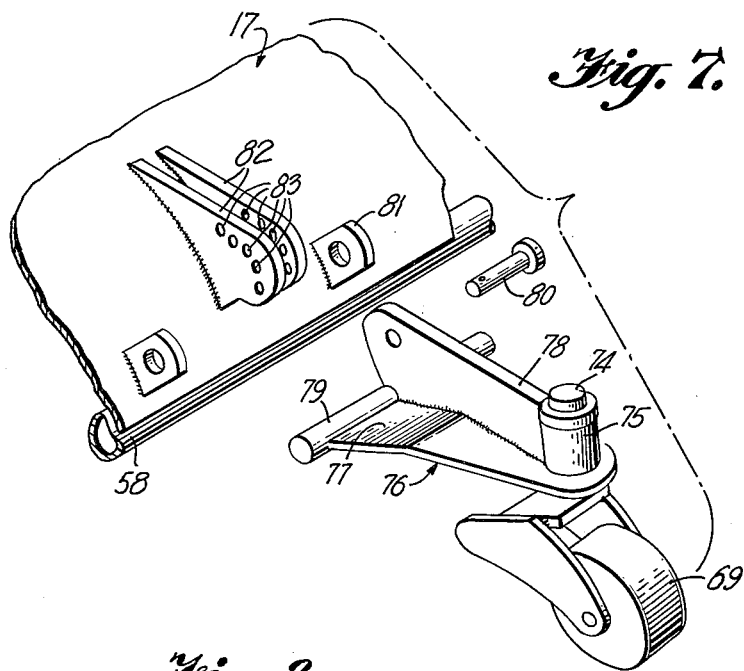
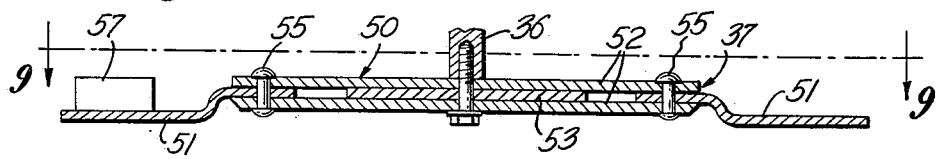
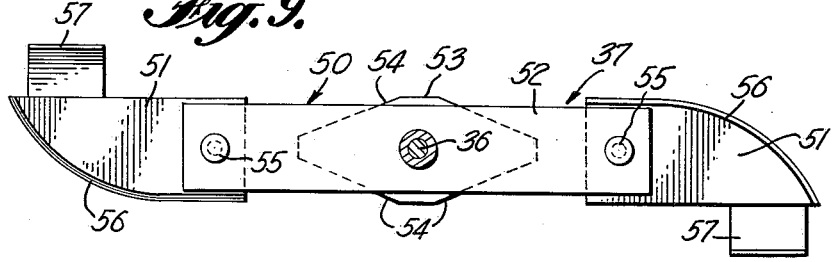

Sept. 11, 1962 H. D. MAGUIRE 3,053,033
MOWER ATTACHMENT FOR TRACTORS
Filed Feb. 25, 1960 6 Sheets-Sheet 5
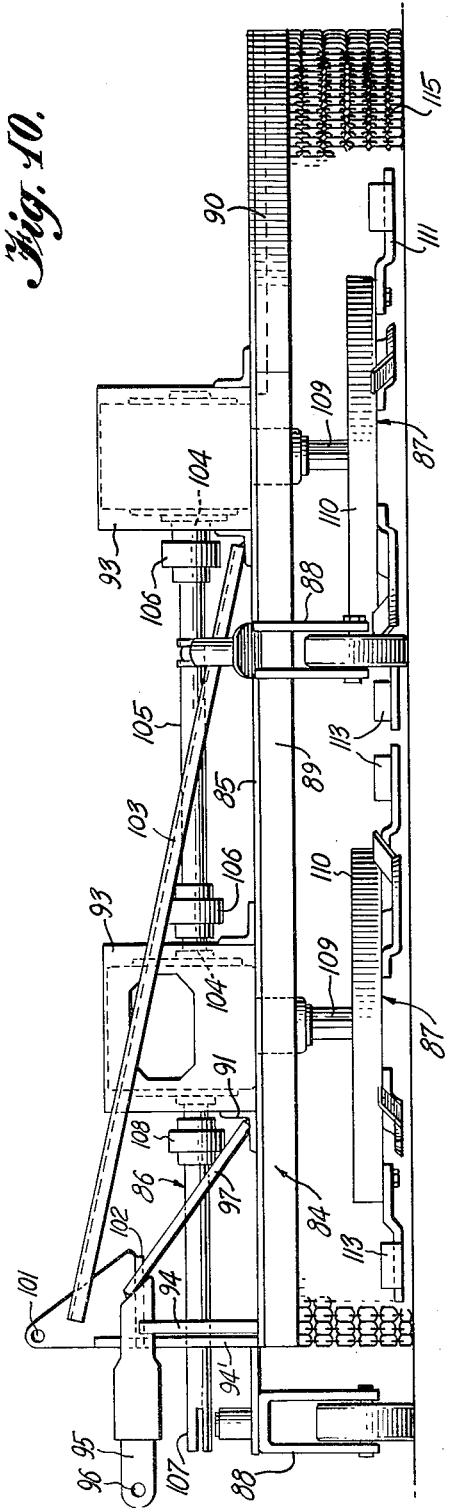
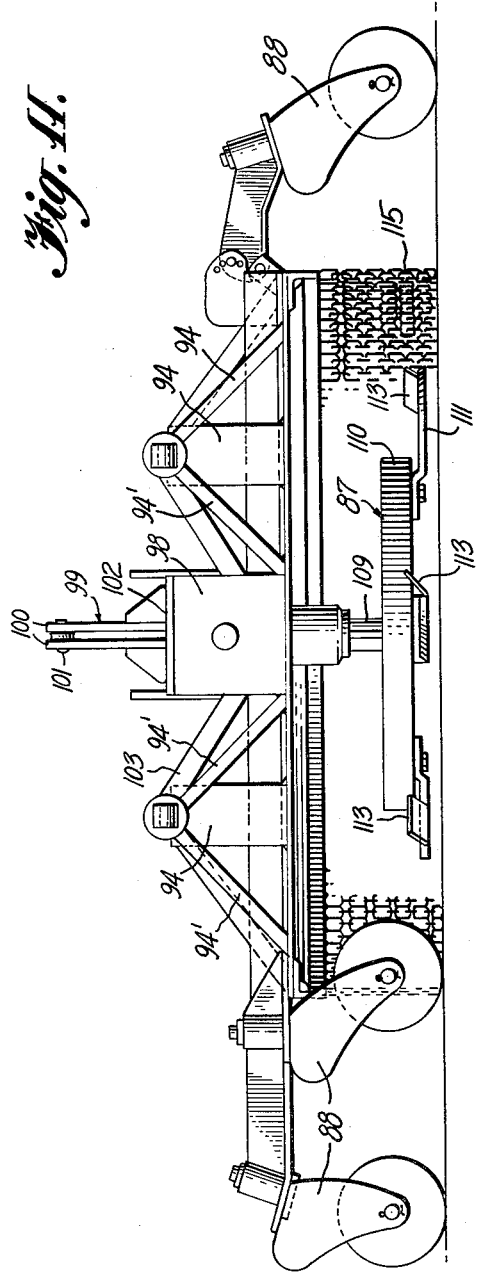
INVENTOR
Harold D. Maguire
BY
Mason, Fenwick & Lawrence
ATTORNEYS Sept. 11, 1962 H. D. MAGUIRE 3,053,033
MOWER ATTACHMENT FOR TRACTORS
Filed Feb. 25, 1960 6 Sheets-Sheet 6
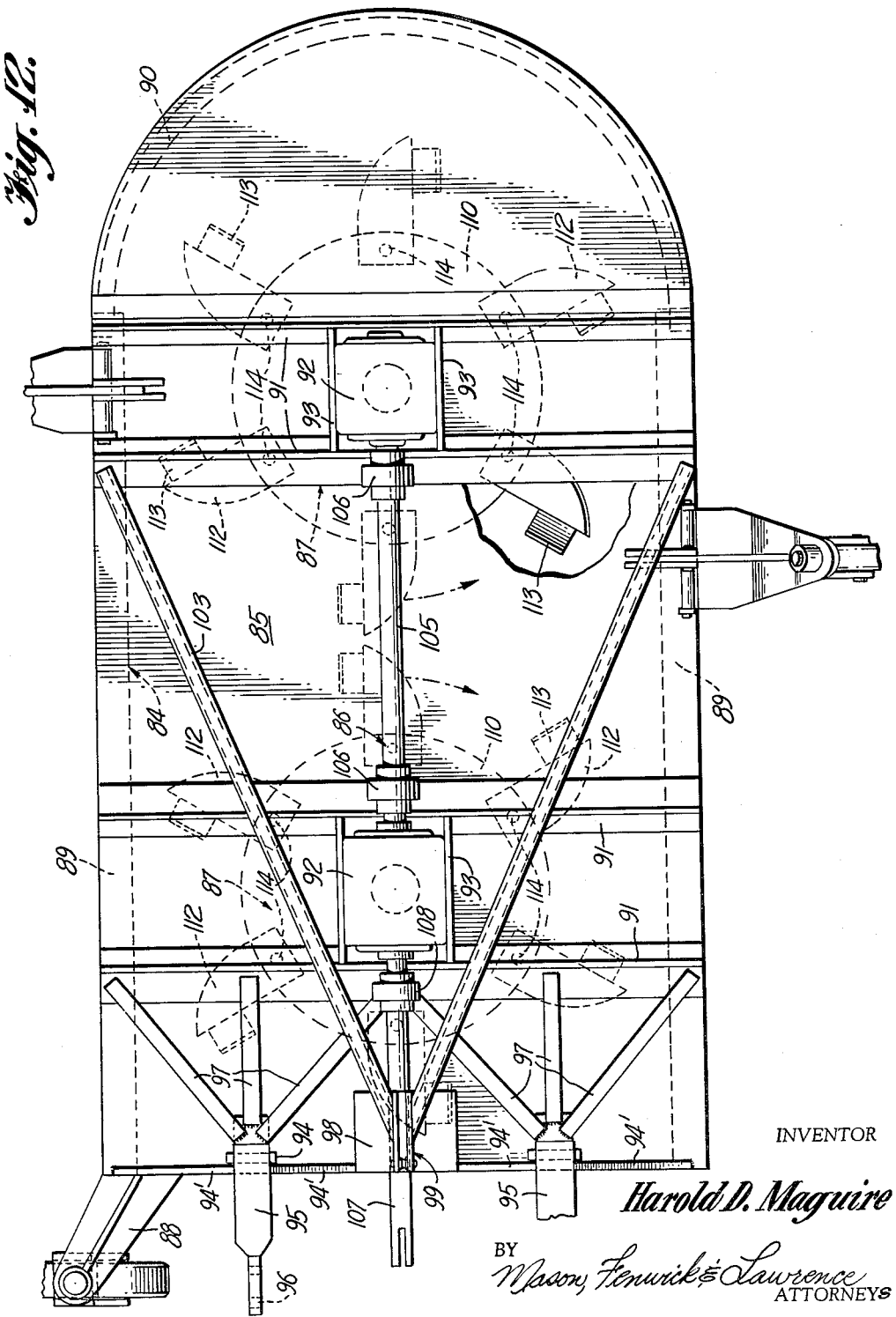
INVENTOR
Harold D. Maguire
BY
Mason, Fenwick & Lawrence
ATTORNEYS United States Patent Office 3,053,033
Patented Sept. 11, 1962

3,053,033
MOWER ATTACHMENT FOR TRACTORS
Harold D. Maguire, Orlando, Fla.
(P.O. Box 577, Ocoee, Fla.)
Filed Feb. 25, 1960, Ser. No. 11,081
6 Claims. (Cl. 56—25.4)

This invention relates to mechanical mowing machines, and particularly to mowers adapted for use with a tractor having a side mounting similar to the one disclosed in my co-pending application, Serial No. 688,951, filed October 8, 1957, now Patent No. 2,976,937, entitled Cultivator Attachment for Tractors.

It is desirable, particularly when working in orchards and in other places having trees with low hanging branches, to have a mower capable of cutting under the trees while the tractor circles the tree, and to have a mower capable of entering under low hanging branches without danger of injury to the trees. It is also desirable to have a mower of this type which is readily attachable to a tractor having a side mounting rig and controls of the type shown in the above-mentioned application, which renders it particularly adaptable to use along roadways and for general mowing use.

The principal object of the present invention is to provide a mower which is particularly fitted for, although not limited to, the use mentioned above.

A more specific object of the invention is to provide a mower which is capable of moving under, and lifting, low hanging branches of trees, so that grass may be cut under the trees without endangering the trees.

Another object is to provide a mower of this type which when attached to a tractor, will be capable of following ground contour, or cutting along banks, etc.

A further object is the provision of a mower having tandem blades, with the blade rotational fields overlapping to ensure complete cutting over the full mower length.

Yet another object is to provide a mower capable of height adjustment as well as angle, or tilt, adjustment.

A still further object is the provision of a mower having a shielding curtain to break the outward force of solid articles thrown by the mower blades to prevent injury to persons or animals in the area.

Yet another object is the provision of a mower having means to cause the grass to be cut to rise up into the path of the blade to prevent it from being blown down out of reach of the rotating blade.

Other objects of the invention will become apparent from the following description of practical embodiments thereof, when taken in conjunction with the drawings which accompany, and form part of, this specification.

In the drawings:

FIGURE 1 is a side elevation of a tractor with a mower embodying the principles of the present invention attached to the side thereof;

FIGURE 2 is a partial rear elevation of the equipment shown in FIGURE 1, parts being broken away and parts being shown in section FIGURE 3 is an enlarged top plan view of the mower detached from the tractor;

FIGURE 4 is a vertical, longitudinal section through the mower, taken substantially on the line 4—4 of FIGURE 3, with parts being broken away;

FIGURE 5 is an enlarged end view of the mower, viewed from the side which connects to the tractor lift;

FIGURE 6 is a vertical, transverse section, taken on the line 6—6 of FIGURE 3, parts being broken away;

FIGURE 7 is an enlarged perspective view of a part of the mower hood, an adjustable caster wheel, and its connection to the hood, the parts being shown unassembled and separated;

FIGURE 8 is a section taken through one of the mower blades shown on an enlarged scale, and is taken on the line 8—8 of FIGURE 6;

FIGURE 9 is a section taken just above the blade on line 9—9 of FIGURE 8, viewing the blade in top plan;

FIGURE 10 is a side elevation of a somewhat modified form of mower;

FIGURE 11 is an end view of the mower shown in FIGURE 10, viewed from the end which connects to the tractor; and FIGURE 12 is a top plan view of the modified structure parts being broken away.

In general, the invention is concerned with a mower which will employ two rotary blades to cut a wide swath, and which will be attachable to the side of a tractor and capable of cutting grass beneath trees while the tractor which carries it circles the tree. The mower is of novel frame construction to enable it to be supported from one end and extend rigidly outward from its support. Several safety features are incorporated in the structure.

Referring to the drawings in detail, and first to that form of the invention shown in FIGURES 1 through 9, there is shown an improved mower 1 attached to the side of a tractor 2 by means of connecting linkage 3. The tractor and the attachment connecting linkage and controls 3' are described in detail in the above-mentioned application. Briefly, the connecting linkage consists of a mounting plate 4, fixed to the tractor frame, and a pair of joined telescopic arms 5, pivotally attached to the mounting plate 4 and pivotally connected by pins 29 to the attachment to be mounted, in the present instance the mower 1. The attachment is controlled, that is raised and lowered, by means of a control cable 6 which passes over suitable pulleys 7 and is attached to the standard lift arm 8 at the rear of the tractor. A drive for the attachment is provided from the rear power take-off 9 of the tractor through a gear box 10, shaft 11, pulleys 12 and 13, and belt 14 to a drive shaft 15 which is carried by the arms 5 and which is also telescopic.

The mower 1 includes a frame 16, which supports the working parts of the machine, and a cover 17 to protect the working parts and to lift low hanging tree limbs as well as to protect the operator and others who may be nearby. The cover is suitably braced from the frame, as will be described.

The frame includes a pair of spaced, parallel side bars 18, held in fixed position by means of a plurality of transverse frame angle members 19, 20 and 21 which are welded at their ends to the bars 18. The angle members have their depending flanges notched, as at 22, to accommodate the mower drive shaft, indicated generally at 23. In order to stiffen the angle members in the areas of the notches, upstanding ribs 24 are provided extending longitudinally along the central portions of the top flanges. Gear box mounting plates 25 are welded between the angle members 19 and 20, and occupy vertical positions, parallel to the side bars, and at equal distances on opposite sides of the longitudinal center line of the frame. Similar mounting plates 26 are welded to the angle member 21 and project outwardly therefrom. The outer, free ends of plates 26 are joined to the ends of the bars 18 by braces 27 to stiffen the plates and hold them rigid. Thus, a frame is provided which is braced in all directions and is capable of maintaining its flat, planar condition without twisting or warping in normal use. The ends of rods 18 project inboard beyond the cover and have their ends flattened, as at 28, to provide means for connecting the frame to the connecting arms 5. Removable pins 29 are used for this connection so that the mower can be coupled to and uncoupled from the tractor simply and quickly.

Gear housings 30 and 31 are positioned between the plates 25 and 26 and suitably fastened to the plates. The gear boxes are identical except that box 30 has its shaft 32 extending beyond the box at both sides, whereas shaft 33 of box 31 projects at one side only. Shaft 33 carries bevel gear 34 which meshes with bevel gear 35 on a downwardly projecting blade shaft 36. Blade 37 is coupled to the bottom of shaft 36. Gear box 30 houses similar gearing (not shown) and its blade shaft 38 carries blade 39. Shafts 32 and 33 are interconnected by a shaft 40 by means of couplings 41 and 42. The couplings are in the form of internally splined sleeves and the shafts have splined ends which slide into them. A tubular protective housing 43 surrounds the shafts and couplings. A similar coupling 44 is used to join the other end of shaft 32 to a driving shaft 45 which projects beyond the mower cover, through a bearing 46 carried by the cover, for attachment to the drive shaft 15 from the tractor. A tubular protecting housing 47 surrounds shaft 45. The several shaft assemblies are held in position by means of brackets 48, which are secured to the undersides of angle members 19, 20 and 21, and have downturned arms 49. After the shafts are assembled, the arms 49 are bent inwardly to surround the protective housings and support the assemblies (see FIGURE 6).

The blades 37 and 39 are identical, and are mounted upon their respective shafts so that they are oriented 90° relative to one another. This allows the shafts 36 and 38 to be spaced so that the orbital paths of the blades overlap to ensure complete cutting across the combined rotational span of the blades. As the blades are identical, only one will be described.

Blade 37 is shown in detail in FIGURES 8 and 9. It consists of a central portion 50, fixed to shaft 36, and knife elements 51, pivotally attached to the ends of the central section. The central section is formed of two strips 52 held in spaced relation by means of a spreader plate 53. The plate 53 is shorter than the strips 52 and positioned medially thereof so as to permit insertion of the knives 51 between the strips. It will be noted from FIGURE 9 that the edges of the spreader plate are inclined, as at 54, to allow the knives to rotate through an extended arc about their pivots 55 without striking the spreader.

The knife blades are flat, with their leading edges 56 curved and sharpened. At the trailing edge of each blade there is a rearwardly inclining vane 57. The upward deflection of the vanes will cause an upsweep of air as the blades are rotated so as to lift the grass and hold it in the path of rotation of the blades.

The cover 17 is constructed upon a U-shaped tubing frame 58. An inner end plate 59 bridges the ends of the open legs of the U-shaped frame, and a pair of spaced bow members 60 span the legs adjacent the curved end of the U and have their ends fixed to the legs. The top of the plate 59 is curved convexly to correspond to the bows 60, and forms with the bows a shaping surface for the cover sheet 61 to cause the cover to have a smoothly curving contour from edge to edge to serve as a camming surface to lift low hanging tree limbs gently and support them as the mower moves beneath them. The cover sheet 61 declines from the bows 60 to the curved portion of the U-shaped frame to provide an inclined end 61' for the cover to allow it to freely enter under trees. The cover extends to the U-shaped frame which is quite close to the ground surface when in use. The end plate projects substantially to ground level to provide a rigid shield at the operator side of the mower to preclude any possibility of articles being thrown out by the blades. The cover is attached to the mower frame by means of the frame bars 18 passing through openings in the cover end plate 59, and by straps 60' which surround the bars 18 and have their ends secured to the bows 60.

A flexible curtain 62 is mounted to hang from the underside of the U-shaped cover frame 58. The curtain may be made of suitable mesh. It is shown as composed of a plurality of vertically hanging chains 63. The chain curtain will serve to arrest the force of objects struck and thrown by the blades, yet permit them to emerge from beneath the mower so that they will not be held in the path of the blades, yet will not be thrown out with such force as to injure persons near the scene of operations.

In order to provide for connection of the control cable 6 to the mower for raising and lowering it, a bracket 64 is affixed to the top of the cover. Bracket 64 has a relatively large base plate 65, curved to the contour of the cover, welded around its edges to the cover sheet at its edge adjacent the end plate 59. This will distribute the lifting force over a large area of the cover sheet. A pair of upstanding arms 66 is carried by the base, and the arms are apertured to receive a removable cable pin 67.

The mower is supported when in operative position by means of caster wheels. These consist of a non-adjustable caster 68 at the inboard end of the structure, and adjustable casters 69 and 70 at the front and back of the mower on the outboard section. Caster 68 is swivelly mounted by having its stud 71 seated in a socket 72 carried by a mounting bracket 73 welded to the end plate 59 toward the forward edge. Casters 69 and 70 are identical, and only one will be described. Caster 69 is shown in detail in FIGURE 7. The caster has its stud 74 seated in a socket 75 carried by a mounting plate 76, which includes a base member 77 and an upstanding rib 78. A hinge pin 79 extends along the forward edge of the base plate, and rib 78 is apertured to receive a locking pin 80. A pair of pivot lugs 81 is fixed to the cover 17, spaced apart and adapted to receive the ends of the hinge pin 79. A pair of locking plates 82 is fixed to the cover, spaced apart to permit the rib 78 of the caster bracket to move between them. Plates 82 each have a plurality of matching apertures 83 with which the opening in rib 78 may register and into which the pin 80 may be seated to lock the caster assembly in different positions of adjustment. It will be obvious that adjustment of the caster about its hinge will result in raising and lowering the mower from the ground. By having adjustable casters at the front and back of the mower, the entire mower can be adjusted for height, or the angle of the mower relative to the ground, both longitudinally and transversely of the mower, can be varied.

When the mower is to be used, it can be quickly connected to the tractor by placing the flattened ends of the rods 18 adjacent the ends of the arms 5 of the tractor rig and inserting the pins 29. The telescopic drive shaft 15 of the tractor is coupled to the mower drive, and cable 6 is connected to bracket 64. The casters 69 and 70 may be adjusted as desired, and the mower is ready for use. As described, the blades overlap so that a continuous broad swatch is cut. The knife portions of the blades will be held in radial alignment with the central portion during operation due to centrifugal force, yet if the knives strike an obstruction, they may swing backwardly about their pivots to prevent breakage. As soon as the obstruction is passed, the knives automatically return to operative positions.

The particular construction of the frame and cover makes it possible to have the overall height of the mower quite low for under-tree use, yet maintain rugged strength which will hold the structure against warping or twisting even when raised or passing over uneven terrain. The construction also leads to extreme ease of assembly and long life.

The combination of the pivotal knife portions of the blades and the flexible curtain surrounding the cutting area leads to complete safety in operation, both from the standpoint of likelihood of personal injury and breakage of equipment.

That form of the invention shown in FIGURES 10, 11 and 12, while somewhat modified from the structure previously described, is similar to the first form in many respects. This form of mower is heavier and more rugged, and is particularly adapted to roadside, and similar, heavy duty work.

The modified mower is composed of a frame 84 and a cover 85, with drive mechanism 86 and cutters 87. The entire device is mounted upon casters 88, similar to those of the first-described form.

The frame includes a pair of spaced, parallel side rails 89, joined at their outer ends by a semi-circular end frame 90. The U-shaped frame thus formed has the cover 85 seated upon and welded or otherwise fixed to the frame. Transverse frame members 91 bridge the U-frame and are fixed on top of the cover. These members are arranged in pairs spaced apart a sufficient distance to receive the gear boxes 92 of the drive mechanism. The transverse members are connected by gear box mounting plates 93, which extend between the transverse members of each pair to closely embrace, and be attached to, the gear boxes 92.

At the inside end of the mower, that is the end opposite the curved end and which will be attached to the tractor, there are two upstanding supports 94, spaced equi-distant from the longitudinal center line of the frame. These support at their tops two horizontal connecting bars 95 which have eyes 96 at their projecting ends for connection to the tractor lifting linkage. The bars 95 are quite short, and project but a short distance over the mower cover. These latter projecting ends are connected by braces 97 to the most inboard of the transverse frame member 91. Three braces 97 are connected to each connecting bar, and the braces diverge from the bar to the transverse frame member so that each connecting bar is attached to the transverse member at a plurality of points spaced along the transverse member. The braces are so arranged that the load of the mower will be taken from the full length of the transverse member to the connecting bars. There are also two braces 94' which extend laterally from the connecting bars to the cover at the inboard edge of the cover. Thus, the lifting force will be spread to a plurality of points spaced over the inboard end of the mower.

Centrally of the inboard end of the mower there is another vertical mounting bracket 98 which has a cable connecting bracket 99 mounted at its top. Bracket 99 has a pair of upstanding legs 100, apertured at their tops to receive a clevis pin 101. The legs 100 project upwardly from a base 102. The cable connecting bracket is attached to the inboard member of the outboard pair of transverse members by braces 103 which are fixed to the legs 100 of the connecting bracket and to the transverse member near its outer ends. This will distribute the lifting force over the greater portion of the mower frame so that there will be no localized strain and no tendency of the frame to twist when the mower is lifted.

The driving mechanism 86 is mounted on the top of the mower in the modified form. It consists of the gear boxes 92 which have drive shafts 104, a shaft 105 coupled to the gear box shafts by couplers 106, and a drive section 107 connected to the inboard end of the inboard gear box shaft by a coupler 108. Drive section 107 is adapted to be connected to the drive from the tractor. By marking the drive shaft in sections, precision alignment is eliminated and the shaft will not bind if the mower frame should warp slightly in operation. Each gear box has a depending cutter shaft 109 to which the cutters 87 are attached.

The cutters of this form of the invention are slightly different from those previously described. Here, the cutters are in the form of disks 110 to which a plurality of blades 111 are pivotally connected. The blades are relatively short, having curved cutting edges 112 and deflectors, or vanes, 113 on the trailing edges. The blades are pivotally connected to the disks at 114. The two cutters rotate in opposite directions, as shown by the arrows in FIGURE 12. In the present arrangement, the blade paths do not overlap, and each cutter is provided with six blades. The vanes on these blades not only serve to stand up into the path of the blades, but also as stops to prevent the blades from swinging completely under the disk when an obstruction is struck or operation of the cutter is stopped.

A heavy curtain 115 is attached to the mower frame and hangs from the frame down close to the ground to prevent objects struck by the whirling blades from being thrown from beneath the mower. This is particularly advantageous when the mower is used for roadside cutting, where many objects are thrown by passers-by and if hit by the mower blades might strike someone using the highway if not prevented from flying by the depending curtain.

The mower just described will have all of the advantages of the first-described form, and, at the same time, will stand up under harder usage such as will be encountered in general industrial use.

While in the above practical embodiments of the invention have been disclosed, it will be understood that the details of construction described and shown are for purposes of illustration only, and the invention may take other forms within the scope of the appended claims.

What is claimed is:

1. A mower for attachment to a tractor having a pair of arms for side mounting and side drive means comprising, a frame having means for connection to the side mounting arms of the tractor, a drive shaft extending longitudinally of the frame and supported thereby for connection to the drive means of the tractor, a pair of gear boxes spaced along the drive shaft and having downwardly projecting blade shafts, blades mounted upon the blade shafts, a cover mounted on the frame and arched smoothly transversely of the frame to provide a camming surface to lift tree limbs, and ground engaging wheels fixed to the cover to support the mower when in operative position.

2. A mower for attachment to a tractor as claimed in claim 1 wherein said frame comprises, a pair of parallel side bars spaced apart, a plurality of cross-bridging members secured to the side bars to hold them in rigid spaced relation, mounting plates attached to the cross-bridging members and lying parallel to the side bars and spaced apart a distance sufficient to mount said gear boxes between them, and means for attaching the gear boxes to the mounting plates.

3. A mower for attachment to a tractor as claimed in claim 2 wherein said drive shaft is sectional including a section through and projecting from each gear box and a section intermediate the gear box sections, couplings interconnecting the adjacent ends of the several shafts, a protective housing about the shaft and extending between the gear boxes closely embracing the couplings, and brackets secured to the cross-bridging members and having depending arms bent about the protective housing to hold the drive shaft to the frame.

4. A mower for attachment to a tractor as claimed in claim 2 wherein the cover has an end plate having openings through which the side bars project, and straps remote from the end plate securing the cover to the frame.

5. A mower for attachment to a tractor as claimed in claim 4 wherein at least some of the wheels are adjustable relative to the cover to vary the height of the blades from the ground.

6. A mower for attachment to a tractor as claimed in claim 1, wherein the cover has a lower edge held spaced from the ground by the wheels, a flexible protective curtain secured about the lower edge of the cover and extending from the cover lower edge to the ground, and the blades each including a central section fixed to the gear box blade shaft and knife elements pivotally attached to the ends of the central section.

References Cited in the file of this patent

UNITED STATES PATENTS

| | | |
|---|---|---|
| Re. 24,169 | Arrington | June 26, 1956 |
| 1,397,365 | Cook | Nov. 15, 1921 |
| 2,489,204 | Sprick et al. | Nov. 22, 1949 |
| 2,585,296 | Bennett et al. | Feb. 12, 1952 |
| 2,682,740 | Miller et al. | July 6, 1954 |
| 2,777,272 | Smith et al. | Jan. 15, 1957 |
| 2,806,339 | Whitney | Sept. 17, 1957 |
| 2,928,223 | Danuser | Mar. 15, 1960 |
| 2,952,109 | Lambert | Sept. 13, 1960 |